United States Patent [19]
DiSalvo et al.

[11] Patent Number: 4,989,896
[45] Date of Patent: Feb. 5, 1991

[54] DOUBLE DOOR CLOSURE FOR AN AIR BAG DEPLOYMENT OPENING

[75] Inventors: Anthony J. DiSalvo, Allen Park; David J. Bauer, West Bloomfield, both of Mich.

[73] Assignee: Tip Engineering Group, Inc., Farmington Hills, Mich.

[21] Appl. No.: 258,890

[22] Filed: Oct. 17, 1988

[51] Int. Cl.$^5$ .............................................. B60R 21/16
[52] U.S. Cl. ..................................... 280/732; 280/743
[58] Field of Search ............... 280/732, 731, 743, 728, 280/752; 16/225

[56]         References Cited
       U.S. PATENT DOCUMENTS

| | | | |
|---|---|---|---|
| 3,640,546 | 2/1972 | Brawn | 280/732 |
| 3,708,179 | 1/1973 | Hulten | 280/732 |
| 4,097,064 | 6/1978 | Ikawa et al. | 280/732 |
| 4,148,503 | 4/1979 | Shiratori et al. | 280/731 |
| 4,325,568 | 4/1982 | Clark et al. | 280/731 |
| 4,334,699 | 6/1982 | Patzelt et al. | 280/731 |
| 4,752,083 | 6/1988 | Honda | 280/731 |
| 4,895,389 | 1/1990 | Pack, Jr. | 280/732 |

FOREIGN PATENT DOCUMENTS 3116538  11/1982  Fed. Rep. of Germany ...... 280/732

Primary Examiner—Charles A. Marmor
Assistant Examiner—Karin Tyson
Attorney, Agent, or Firm—John R. Benefiel

[57] ABSTRACT

A double door closure for an air bag depolyment opening is disclosed in which bridging portions extend across a line of separation between the doors and are weakened to define a frangible seam fractured by the pressure exerted by the inflating bag. The doors also each have an integral hinge flange formed along the opposite side from the frangible seam and inward raised surfaces defining an area of contact with the air bag to exert maximum shearing stress along the line of separation. In a first embodiment, the doors are of one piece molded construction with the weakening of the bridging portion created by a series of blind pockets molded in from the inside along the line of separation to create a hidden seam. In a second embodiment, the doors are constructed of a support layer and stiffening pieces secured together. In the second embodiment a decorative skin layer overlies the doors, and a piercing piece is driven by the air bag to penetrate the skin layer and initiate tearing.

14 Claims, 2 Drawing Sheets

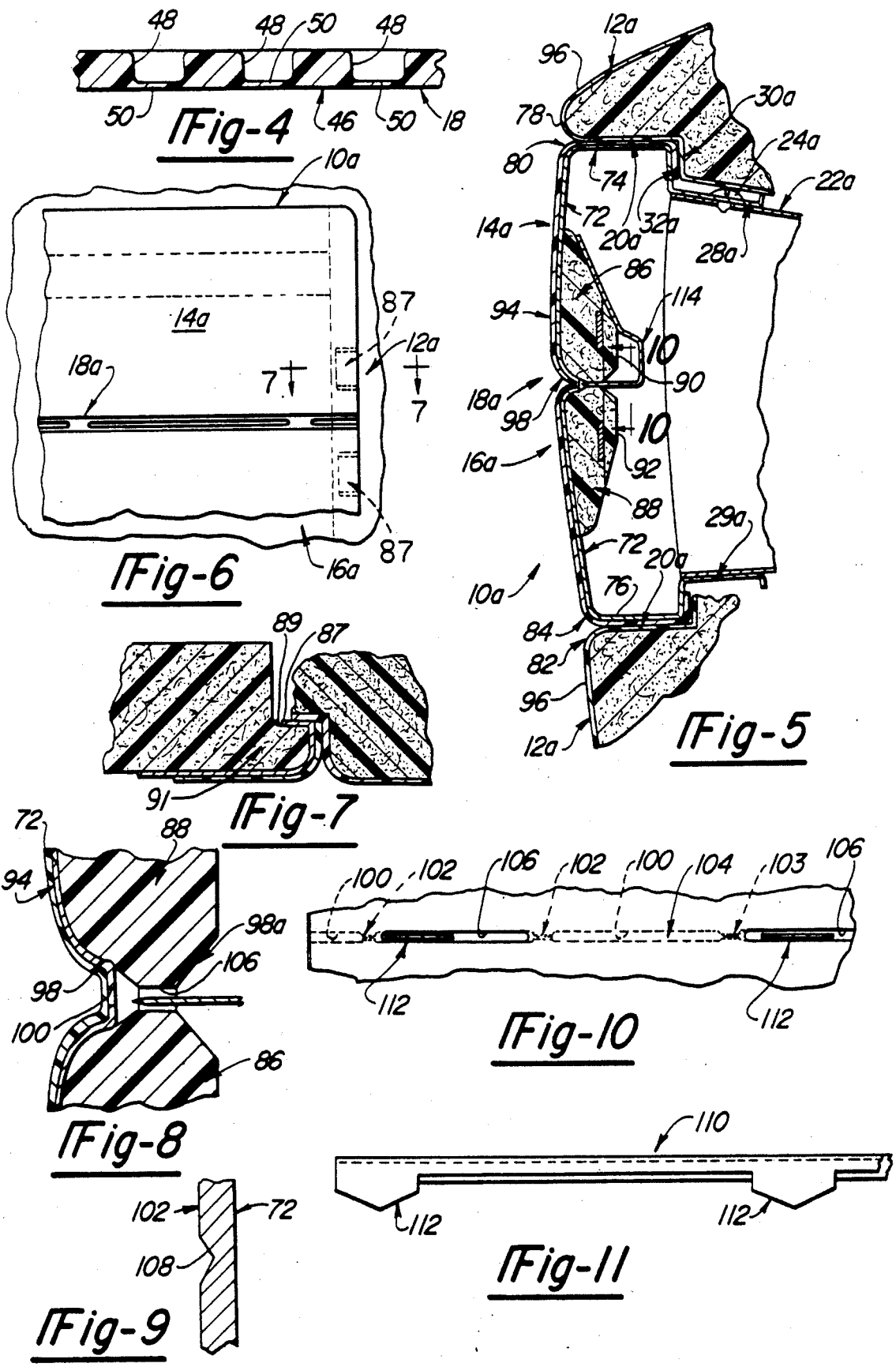

DOUBLE DOOR CLOSURE FOR AN AIR BAG DEPLOYMENT OPENING

FIELD OF THE INVENTION

This invention concerns closures and more particularly closures for an opening defined in an auto interior surface such as an instrument panel through which an inflatable air bag is deployed.

BACKGROUND OF THE INVENTION

Inflatable cushions or "air bags" as they have become to be known, involve rapidly inflating one or more "bags" with a gas to cause them to be moved out from the space in which they are normally stored and to be deployed to be able to act as a safety cushion protecting the occupants from impact with interior structure.

The opening through which the bag deploys must be securely and completely covered to prevent tampering with the system. If objects are inserted into the storage space, they could become dangerous missiles when the bag is deployed, and thus a completely sealed closure must be provided for the opening.

The closure must open very reliably thoughout the range of temperature and other operating conditions of the passenger car in which it is installed, while not interfering appreciably with the deployment of the bag.

The closure should desirably provide a positive indication that the closure has been opened by the deployment of the bag.

Finally, the closure must be simple and lightweight to be reliable and able to be moved rapidly by the inflating bag.

SUMMARY OF THE INVENTION

The present invention comprises a pair of doors hinged along one side and integrally joined together along a line of separation adjacent the other side by bridging portions extending across the line of separation defining a frangible seam which is able to be reliably fractured by the pressure of the inflating air bag to allow both doors to swing apart. In a first embodiment, the doors are of molded construction and are joined together by a molded in bridging portion having a pattern of spaced apart inside blind pockets forming a line of weakening comprising the frangible seam. Stiffening ribs extend along either side of the frangible seam to insure the fracturing is confined along the line of weakening. A series of ribs having raised surfaces adjacent the frangible seam insure that the air bag contacts the doors in the regions immediately adjacent the frangible seam to exert maximum shearing stress.

In a second embodiment, the doors are constructed of a composite of a structural layer and stiffening pieces secured on the inside of the doors. Either or both of the structural layer or stiffening bodies bridge across the seam between the doors, with the bridging portions weakened as with a groove and/or slots, to form the frangible seam. A piercing piece may be provided which punctures an overlying decorative skin layer to initiate tearing thereof as the frangible seam is fractured. The piercing piece is advanced outwardly by the pressure of the inflating air bag.

The stiffening bodies form protrusions adjacent the frangible seam to insure contact with the inflating air bag so as to exert maximum shearing stress on the frangible seam.

DESCRIPTION OF THE DRAWINGS

FIG. 4 is an enlarged view of the section 4—4 taken in FIG. 3.

FIG. 5 is a transverse sectional view taken through a closure according to a second embodiment of the present invention, with fragmentary portions of the adjacent structure.

FIG. 6 is a fragmentary plan view of the closure shown in FIG. 5.

FIG. 7 is a view of the section 7—7 taken in FIG. 6.

FIG. 8 is an enlarged view of a portion of the sectional view shown in FIG. 6.

FIG. 9 is an enlarged view of the section 9—9 taken in FIG. 6.

FIG. 10 is an enlarged view taken in the direction of the arrows 10—10 in FIG. 5.

FIG. 11 is an enlarged view of the piercing piece incorporated in the closure of FIGS. 5-10.

DETAILED DESCRIPTION

In the following detailed description, certain specific terminology will be employed for the sake of clarity and a particular embodiment described in accordance with the requirements of 35 USC 112, but it is to be understood that the same is not intended to be limiting and should not be so construed inasmuch as the invention is capable of taking many forms and variations within the scope of the appended claims.

Figures 1, 2:
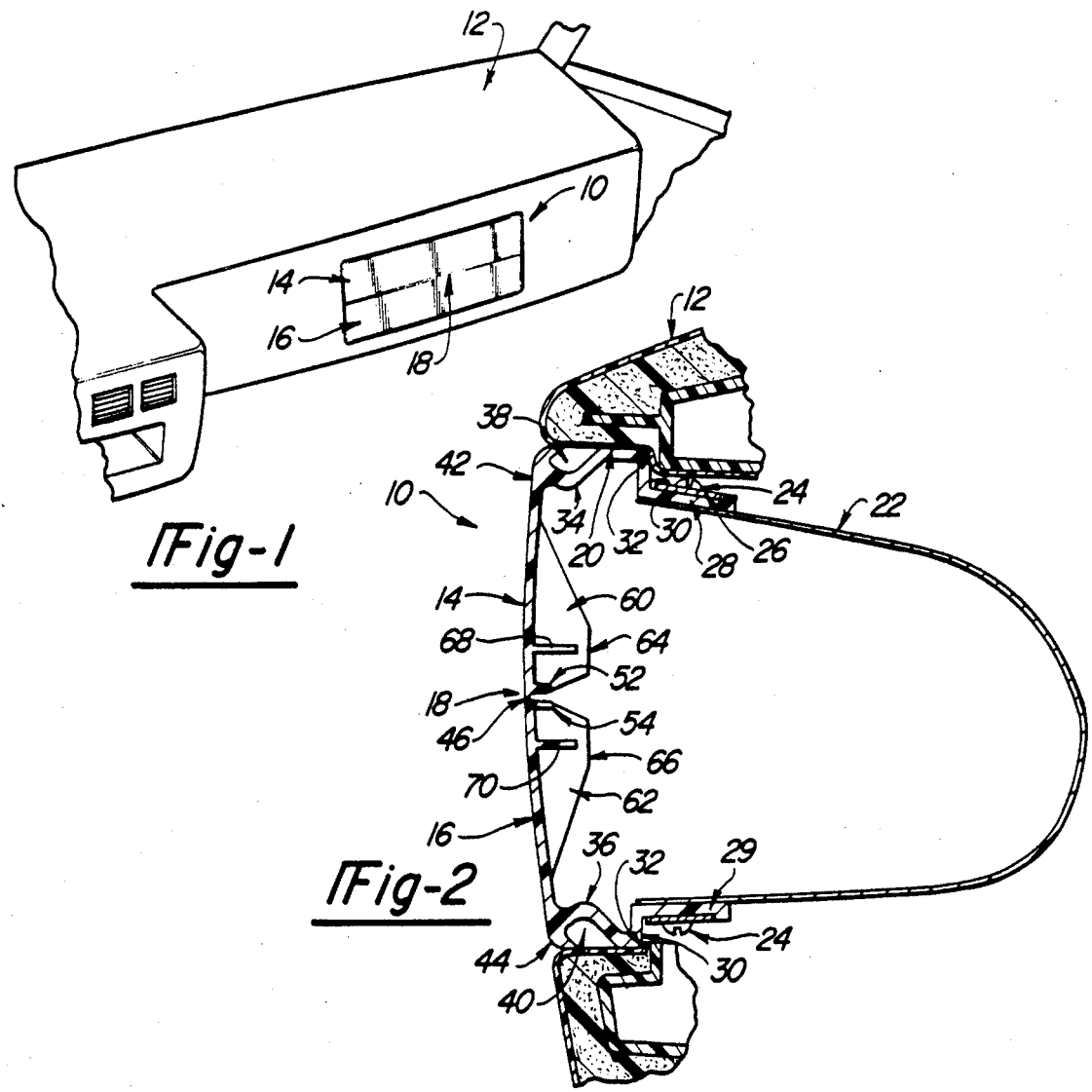
FIG. 1 is a fragmentary perspective view of an auto interior having a closure according to the present invention installed therein.
FIG. 2 is transverse sectional view through a closure according to a first embodiment of the present invention and adjacent structure.

Referring to FIG. 1, the closure 10 according to the present invention is shown installed in the rear facing surface of an instrument panel 12 forming a part of the interior structure of an automobile.

The closure 10 comprises upper and lower doors 14,16 each hinged along their upper and lower side respectively and joined along the contiguous other sides, defining a line of separation, by a frangible seam 18.

In this embodiment, the upper door 14 and lower door 16 are preferably constructed of a suitable structural plastic, molded as one piece, with integral bridging portions extending across and defining the frangible seam 18.

It should be understood that the closure is usable in varying air bag installations with different closure locations.

Figure 3:
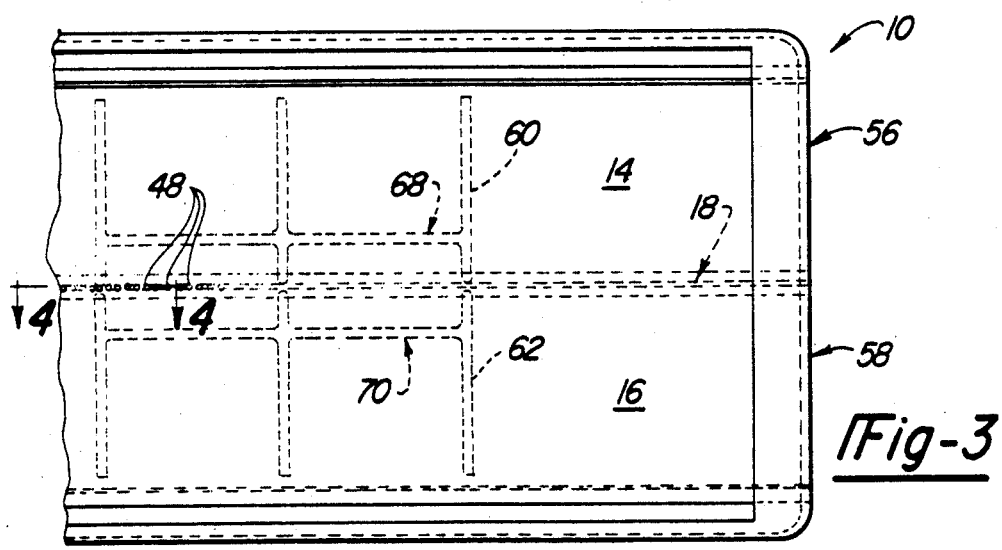
FIG. 3 is a fragmentary plan view of the closure shown in FIG. 2.

FIGS. 2 and 3 show the details of a first embodiment of the closure 10 according to the present invention.

The perimeter of the assemblage of the upper door 14 and the lower door 16 is fit to an opening 20 formed in the plastic reinforced adjacent portions of the instrument panel 12, so as to be able to be received thereto. An air bag cannister 22 is located behind the closure 10 and opening 20.

The air bag doors 14 and 16 are attached to the cannister 22 by means of threaded fasteners 24 passed through reinforcing plates 26 and mounting flanges 28 and 29 integral with each of the upper door 14 and lower door 16. The entire assembly is passed into opening 20, and the cannister 22 thereafter secured to the auto body structure by a mounting arrangement (not shown) to securely retain the assemblage in position.

Abutting shoulders 30 and 32 formed in the flange 28 and instrument panel 12 respectively locate the closure 10 at the correct depth in the opening 20 to be flush with the adjacent instrument panel surfaces.

Hinging sections 34 and 36 are integral with the upper door 14 and lower door 16, which are inwardly turned to form groove spaces 38, 40 respectively, which are overlain by lips 42, 44 respectively to present an uninterrupted outer contour. This allows hinging action of each door 14, 16 without interference with the adjacent instrument panel structure.

The upper door 14 and lower door 16 are joined along the intermediate frangible seam 18 by integral bridging portions 46 extending across the frangible seam 18, which bridging portions are weakened to allow reliable fracturing at an appropriate pressure applied by the inflating air bag. FIG. 4 illustrates that the weakening of the bridging portions 46 is produced by a series of blind pockets 48 formed into the bridging portions 46 from the inside to produce greatly reduced thickness sections 50 intermediate the pockets 48.

A pair of reinforcing ridges 52, 54 extend on either side of the frangible seam 18 to confine tearing to be along the frangible seam 18 and door 14 from the lower door. The frangible seam 18 continues along inwardly turned sides 56, 58 of the upper door 14 and lower door 16 for this same purpose.

A series of integral ribs 60, 62 extend inwardly from each of the upper door 14 and lower door 16 in the direction from the hinging side to the frangible seam side, extending from a point adjacent the hinging side to the frangible seam 18 so as to occupy a major proportion of the top to bottom width of the associated door 14 or 16. The ribs 60, 62, are shaped to be highest at a point 64, 66 closely adjacent the frangible seam 18 forming inwardly extending protrusions. Stiffening webs 68, 70 maintain the upright position of the ribs 60, 62. The shape of the ribs 60, 62 insure contact of the inflating air bag so as to exert maximum shearing stress on the frangible seam 18, in turn insuring reliable fracturing of the seam 18 at the appropriate pressure.

The use of the blind pockets 48 presents a smooth uninterrupted outer surface, thus providing a hidden seam along which the upper door 14 and lower door 16 separate.

Referring to FIGS. 5–11, a second embodiment of the closure 10 according to the present invention is disclosed. This embodiment also includes an upper door 14a and a lower door 16a, each hinged about their upper and lower sides respectively and joined along their contiguous other sides, again, defining a line of separation, by a frangible seam 18a.

The instrument panel 12a is formed with a correspondingly shaped opening 20a into which the closure 10a fits, attached to the air bag cannister 22a with fasteners 24a.

The entire closure - air bag cannister assemblage is placed into the opening 20a, with shoulders 30a, 32a brought into abutment, and thereafter the air bag cannister 22 is secured with other mounting means (not shown).

The construction of the doors 14a, 16a in this embodiment includes a formed support layer 72, preferably of a light weight metal such as aluminum. The support layer 72 is integrally formed with mounting flange 28a, 29a along the upper and lower respective sides of the upper door 14a and lower door 16a to which is secured the air bag cannister 22a.

Hinging means for the upper and lower sides respectively of the upper door 14a and lower door 16a is provided by an intermediate hinging flange 74, 76 integral with the support layer 72 of each door 14a, 16a.

The radiused corners 78, 80 and 82, 84 of the respective sides of the doors 14a, 16a and adjacent instrument panel portions allow bending thereof as hinging action occurs without interference between the doors and adjacent instrument panel structure, while being tightly fit thereto.

The doors 14a, 16a, also include a integral part separable into pieces 86, 88 extending across the height of each door 14a, 16a, and bonded to the inside of the respective door 14a, 16a. The pieces 86, 88 act to stiffen the respective attached door 14a, 16a. The pieces 86, 88 are shaped with inner peak surfaces 90, 92 highest in the region adjacent a line of separation between the doors 14a, 16a to provide inwardly extending protrusions that insure that the inflating air bag contacts and exerts pressure on the doors in a manner adjacent to the frangible seam 18a so as to maximize the shearing stress applied along the frangible seam 18a. These pieces 86, 88 are preferably molded together of a light weight plastic such as "Dytherm" (TM) plastic.

A decorative skin layer 94 is bonded to the outside of the support layer 74, preferably of vinyl and matching the skin 96 of the instrument panel 12a.

Each of the pieces 86, 88 is of reduced thickness along the line of separation defined by the frangible seam 18a, forming a groove 98 at the front and 98a at the back. The support layer 72 and decorative skin 94 are formed to be fit into the groove 98.

The pieces 86, 88 are secured to the support layer 72 by tabs 87 wrapped around and received into recesses formed on a ledge feature 91 on either side of each door 14a, 16a (FIG. 7).

Both of the support layers 72 and the pieces 86, 88 of the respective doors 14a and 16a are of one piece integral construction, with bridging portions of each extending across the frangible seam 18a, and a weakening relief formed into each bridging portion.

Such bridging portions are provided by the solid areas 102 between a series of slots 100, formed in the bridging portions of the support layer 72; and, solid areas 104 intermediate slots 106 formed in the bridging portions of the pieces 88, 86 (FIG. 10).

The solid areas 102 are further weakened by grooves 108 formed on the inside thereof (FIG. 9).

The decorative skin layer 94 is preferably unbroken to defeat any tendency to insert objects past the closure 10a. In order to initiate propagation of a tear along the frangible seam 18a, a piercing piece 110 is provided having a series of piercing point elements 112 along the length thereof. Each element 112 is positioned in registry with overlapping portions of the slots 100 and 106 so as to have a free path of advance into the decorative skin layer 94.

A plunger backing portion 114, extends up over the peak 18 of one of the pieces 86, so as to be engaged and advanced by the inflating air bag prior to engagement thereof with the peak surface 90. Thus, the piercing point elements 112 are advanced just far enough to penetrate the decorative skin layer 94 to initiate tearing, but are still recessed in groove 98.

Accordingly, each of these embodiments achieves the objects of the present invention as above recited.

We claim:

1. A closure for a deployment opening for an automotive air bag system, said opening formed in a mounting structure forming a part of the interior structure of an automobile comprising:

a door assemblage of an upper door and a lower door connected together on either side of a line of separation, and together configured to be fit within and completely close off said opening;

hinging means associated with a side of each door opposite said line of separation allowing each of said upper door and lower door to swing out from said opening when said doors are free along said line of separation;

said door assemblage including a bridging portion integral with each of said upper door and lower door and extending across said line of separation, said bridging portion being weakened to form a frangible seam extending along said line of separation;

at least one protrusion extending inwardly from each of said upper and lower closure doors, each protrusion having a peak surface adjacent said line of separation to cause contact with an inflating air bag on said doors so as to insure maximum shearing pressure on said bridging portion; each protrusion extending from a point adjacent the hinging side to said frangible seam to occupy a substantial proportion of the top to bottom width of the associated doors.

2. The closure according to claim 1 wherein said door assemblage is comprised of a unitary molded piece.

3. The closure according to claim 2 further including a plurality of upstanding ribs forming said protrusions and extending inwardly from the inside of each of said upper door and lower door, said ribs each extending in a direction from the line of separation to the hinging means and having an inmost point adjacent to said line of separation and comprising one of said peak surfaces, whereby a deploying air bag will contact each of said upper and lower doors adjacent said frangible seam.

4. The closure according to claim 2 further including a pair of inwardly extending ridges formed in each of said upper door and lower door extending along said line of separation, whereby fracturing of said frangible seam is confined to said line of separation.

5. The closure according to claim 2 wherein said bridging portion is formed with a series of inwardly facing molded blind pockets with intermediate connecting portions distributed along said line of separation and forming said frangible seam.

6. The closure according to claim 1 wherein each of said upper door and lower door are comprised of a structural layer and a stiffening piece attached to the inside of said structural layer of each of said upper door and lower door, said bridging portion comprised of portions of said structural layer and stiffening piece of one of said upper or lower door extending across said line of separation from each of said upper door and lower door to the structural layer and stiffening piece of the other of said upper or lower door.

7. The closure according to claim 6 wherein said bridging portion weakening comprises a series of slots connecting said bridging portions.

8. The closure according to claim 7 further including a decorative layer disposed over said structural layer and uninterruptedly over said bridging portion and line of separation; and further including a piercing piece mounted inside said closure and having at least one piercing point facing towards said decorative layer and extending along said line of separation aligned with one of said slots, said piercing piece having a part projecting inwardly from said doors located to be able to be engaged by an inflating air bag in advance of contact by an inflating air bag with the inside of said closure upper door and lower door to pierce and initiate tearing of said decorative layer along said line of separation.

9. The closure according to claim 8 wherein each stiffener piece incorporated in said upper closure door and lower closure door is formed with said inwardly extending protrusion located adjacent said line of separation to cause contact of an inflating air bag therewith to exert maximum shearing stress on said bridging portions.

10. The closure according to claim 9 wherein said bridging portion includes portions integral with both of said stiffener pieces.

11. The closure according to claim 10 wherein said bridging portion also includes portions integral with said structural layer.

12. The closure according to claim 7 wherein said bridging portions have slot connections formed therein and wherein said bridging portion of said structural layer is further weakened by being grooved through one side on portions of said structural layer intermediate said slot connections.

13. The closure according to claim 6 wherein said hinging means comprises a radiused corner formed in said support layer on the upper and lower sides respectively of said upper and lower doors, whereby bending around said corners allows hinging of said doors without interference from said mounting structure.

14. A closure for a deployment opening for an automotive air bag system, said opening formed in a mounting structure forming a part of the interior structure of an automobile comprising:

an air bag cannister mounted behind said opening;

a door assemblage of an upper door and a lower door connected together on either side of a line of separation, and together configured to be fit within and completely close off said opening;

hinging means associated with a side of each door opposite said line of separation allowing each of said upper door and lower door to swing out from said opening when said doors are free along said line of separation;

said door assemblage including a bridging portion integral with each of said upper door and lower door and extending across said line of separation, said bridging portion being weakened to form a frangible seam extending along said line of separation;

said hinging means comprising an inwardly turned flange integral with each of said upper door and lower door, said flange formed with a lip, a groove space located just inward of said lip, said lip projecting over said groove space, and said lip defining a portion of the outermost perimeter of the respective connected together upper door and lower door.

* * * * *